United States Patent
Shi et al.

(10) Patent No.: US 8,306,428 B2
(45) Date of Patent: Nov. 6, 2012

(54) OPTOELECTRONIC SWITCH TRANSMITTER USING MILLIMETER WAVELENGTH

(75) Inventors: Jin-Wei Shi, Taipei (TW); Nan-Wei Chen, Taoyuan County (TW); Feng-Ming Kuo, Kaohsiung County (TW); Hsuan-Ju Tsai, Taoyuan County (TW)

(73) Assignee: National Central University, Jhongli, Taoyuan (TW)

( * ) Notice: Subject to any disclaimer, the term of this patent is extended or adjusted under 35 U.S.C. 154(b) by 326 days.

(21) Appl. No.: 12/833,197

(22) Filed: Jul. 9, 2010

(65) Prior Publication Data
US 2011/0142451 A1 Jun. 16, 2011

(30) Foreign Application Priority Data
Dec. 10, 2009 (TW) .............................. 098142242 A

(51) Int. Cl.
*H04B 10/00* (2006.01)

(52) U.S. Cl. ........ 398/116; 398/115; 398/182; 398/183; 398/201; 333/262; 250/493.1; 455/91; 342/175

(58) Field of Classification Search .......... 398/115–139, 398/182, 183, 186–201; 333/262; 342/175, 342/134; 250/493.1; 455/91
See application file for complete search history.

(56) References Cited

U.S. PATENT DOCUMENTS

| | | | |
|---|---|---|---|
| 6,320,476 B1 * | 11/2001 | Tsukahara | 333/104 |
| 2005/0017829 A1 * | 1/2005 | Higgins | 333/262 |
| 2005/0190101 A1 * | 9/2005 | Hiramatsu et al. | 342/175 |
| 2009/0298443 A1 * | 12/2009 | Ta et al. | 455/83 |

* cited by examiner

*Primary Examiner* — Li Liu
(74) *Attorney, Agent, or Firm* — Jackson IPG PLLC

(57) ABSTRACT

An optoelectronic switch using millimeter wavelength (MMW) is provided. An r voltage pulse is applied to a device under test (DUT) for switching the photo-generated MMW power The DUT is operated under reverse bias. An optical light source with modulated MMW envelop is injected on to DUT for MMW power generation. Thus, based on change of the reverse bias, speed is violently changed and the MMW optoelectronic switch is thus obtained.

20 Claims, 9 Drawing Sheets

US 8,306,428 B2

OPTOELECTRONIC SWITCH TRANSMITTER USING MILLIMETER WAVELENGTH

TECHNICAL FIELD OF THE DISCLOSURE

The present disclosure relates to an optoelectronic switch; more particularly, relates to operate a device under test (DUT) under a reverse bias for obtaining a millimeter wavelength (MMW) optoelectronic switch having great change in electron drift-velocity based on change of the reverse bias.

DESCRIPTION OF THE RELATED ARTS

In an MMW radio communication system, high-frequency switch is a very important component. On designing a high-frequency circuit, efficiency of the circuit is usually limited by the components. For a high-frequency switch using MMW, isolation of the switch under on/off states is limited by characteristics of the components. When a field effect transistor (FET) is in an off state under a high frequency, an equivalent capacitor is formed by drain and source of a transistor. Thus, a low resistance, not a high resistance, is formed, and so performance of the whole circuit is affected. Besides, in the high-frequency circuit, signals are often coupled between abiding lines and so performance of the whole circuit is further affected. Hence, resistance isolation is not good in high-frequency band of the switch.

Figure 8:
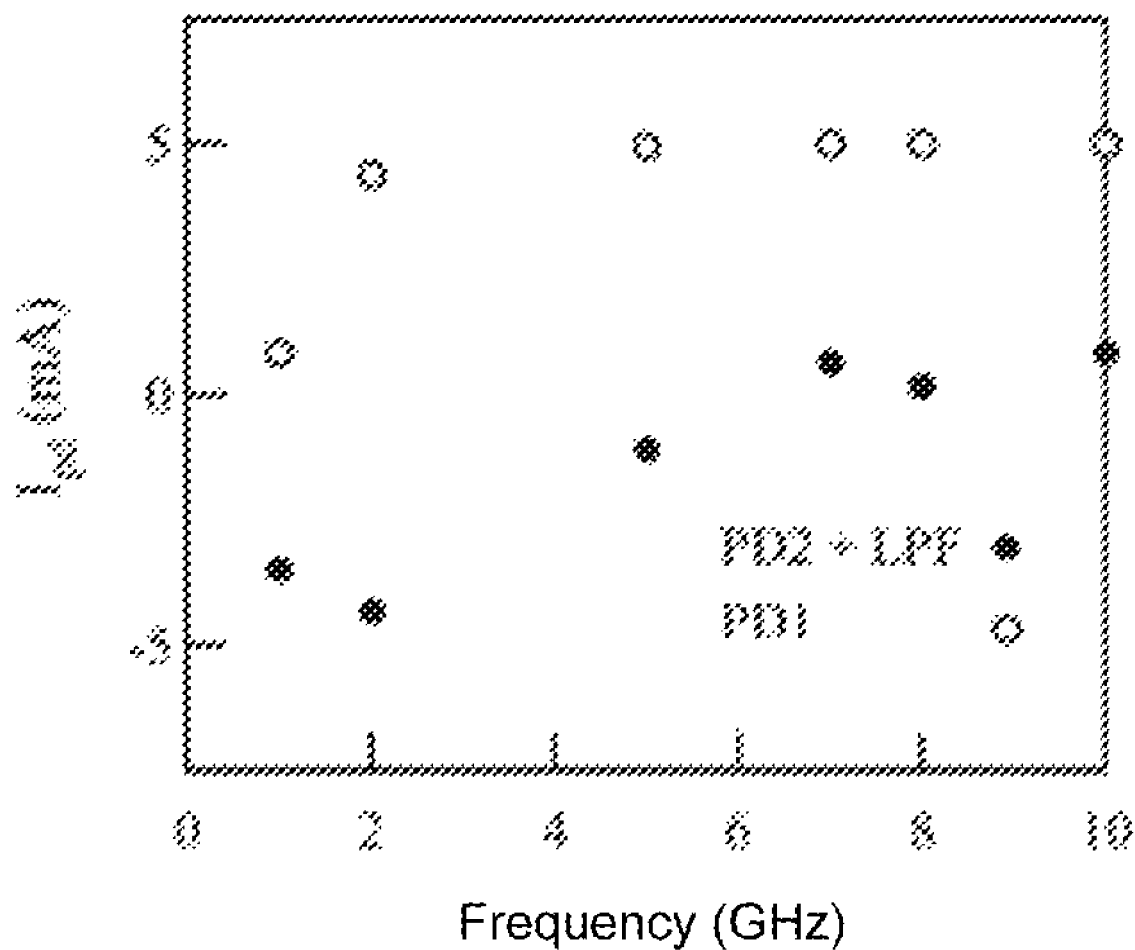

Therefore, uni-traveling-carrier photodiode (UTC-PD) is introduced. However, its speed on isolation is not fast enough. When a device having this structure is switched and data signals are imported, a forward bias is required; but, repeated operations between forward bias and reverse bias are needed to make big change on current to operate the switch. In FIG. 8, change of a photocurrent is very obvious for switching. Devices are normally operated under reverse bias, but the UTC-PD is repeatedly operated between forward bias and reverse bias. As a result, the device becomes unstable in performance.

Figure 9:
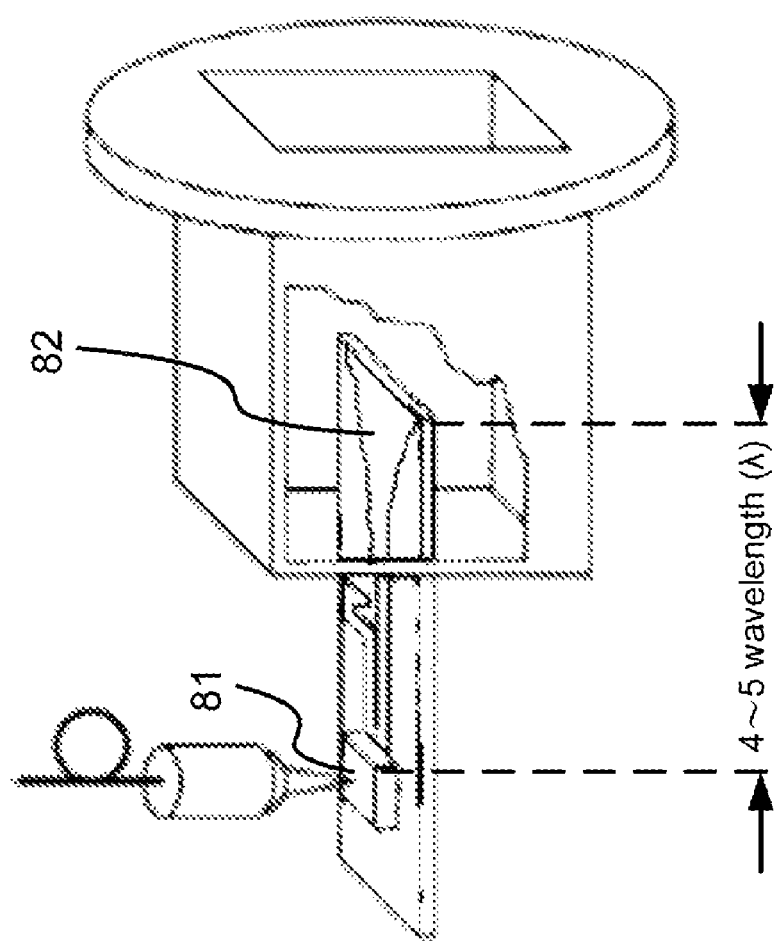

Another prior art shows in FIG. 9. A distance between its chip 81 and its antenna 82 is big, about 4 to 5 wavelength (λ); and so it can not be easily micro-scaled and its cost becomes high. Hence, the prior arts do not fulfill all users' requests on actual use.

SUMMARY OF THE DISCLOSURE

The main purpose of the present disclosure is to operate a device under test (DUT) under a reverse bias for obtaining an MMW optoelectronic switch having great change in electron drift-velocity-based on change of the reverse bias.

To achieve the above purpose, the present disclosure is an optoelectronic switch transmitter using MMW, comprising an input device; a pulse pattern generator (PPG); a DUT; an antenna-signal processor; and an error detector (ED), where the DUT comprises an intermediate frequency (IF) input; a radio frequency (RF) choke connected with the IF Input; an optoelectronic switch connected with the RF choke; a fan-shaped broadband transition device connected with the optoelectronic switch; and a transmitter connected with the optoelectronic switch; where the DUT is positioned in a waveguide to be combined to a first horn antenna through the waveguide; where the optoelectronic switch has a structure of p-n-p-i-n epi-layers, comprising, from top to bottom, a first p-type doped layer; a first n-type doped layer; a second p-type doped layer; an undoped layer; and a second n-type doped layer; and where the epi-layers are grown on a doped semiconductor substrate or a semi-insulating semiconductor substrate. Accordingly, a novel optoelectronic switch transmitter using MMW is obtained.

BRIEF DESCRIPTIONS OF THE DRAWINGS

Figure 1:
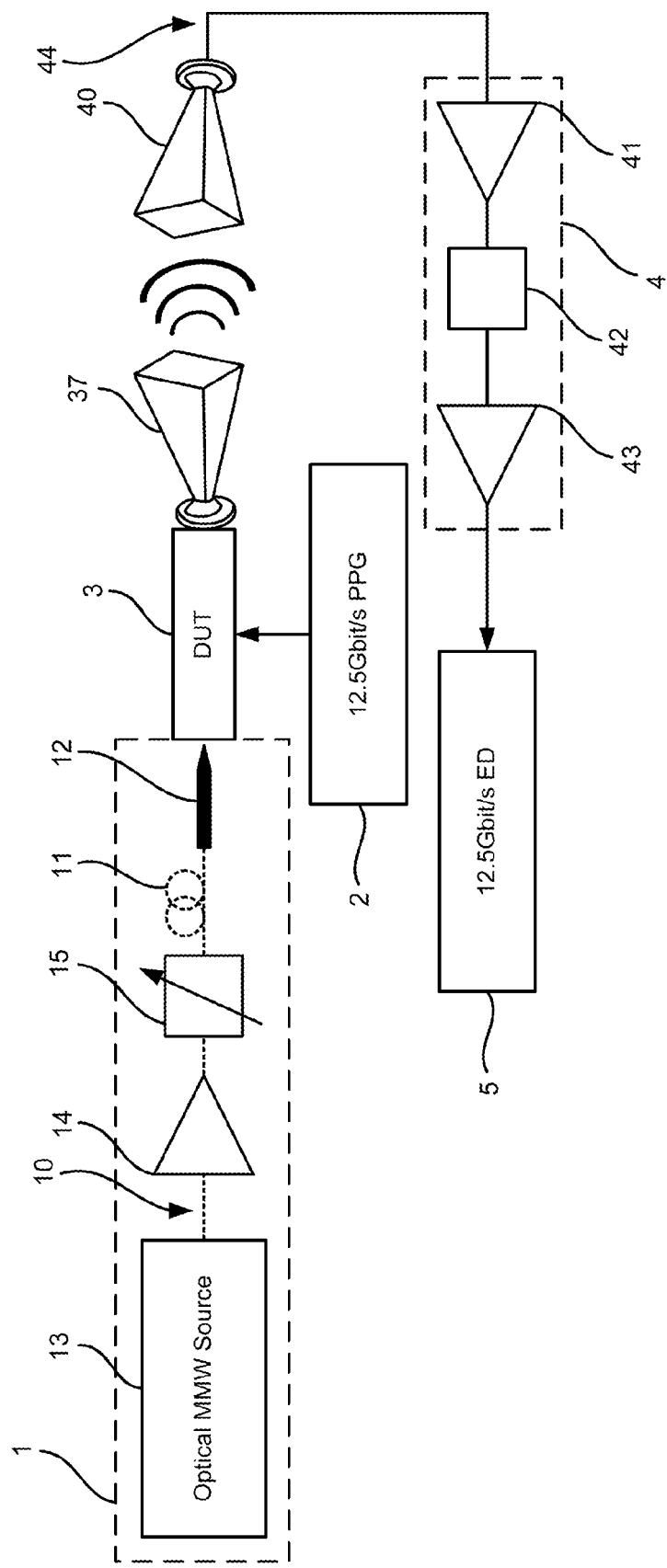
Figure 2:
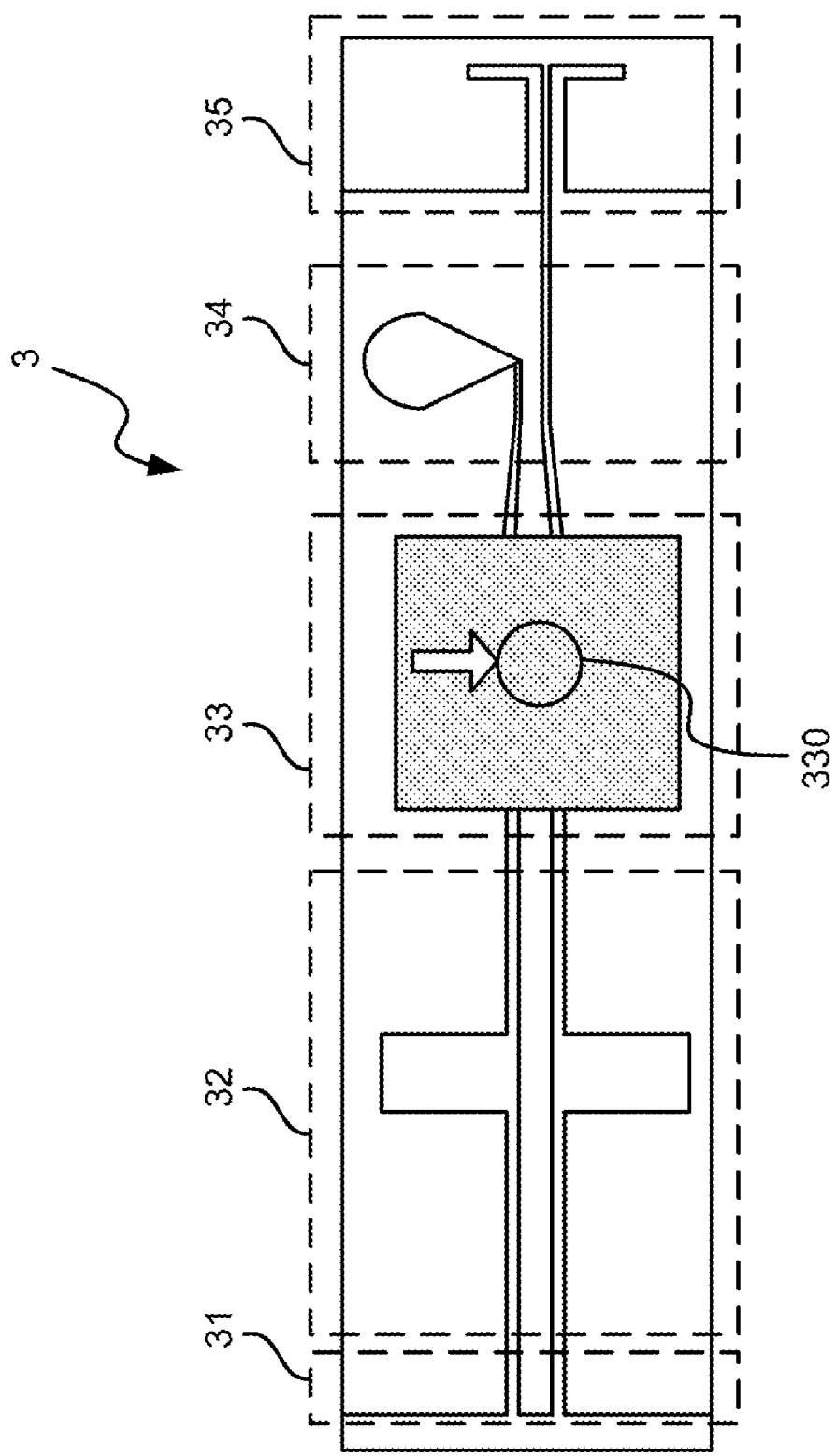
Figure 3:
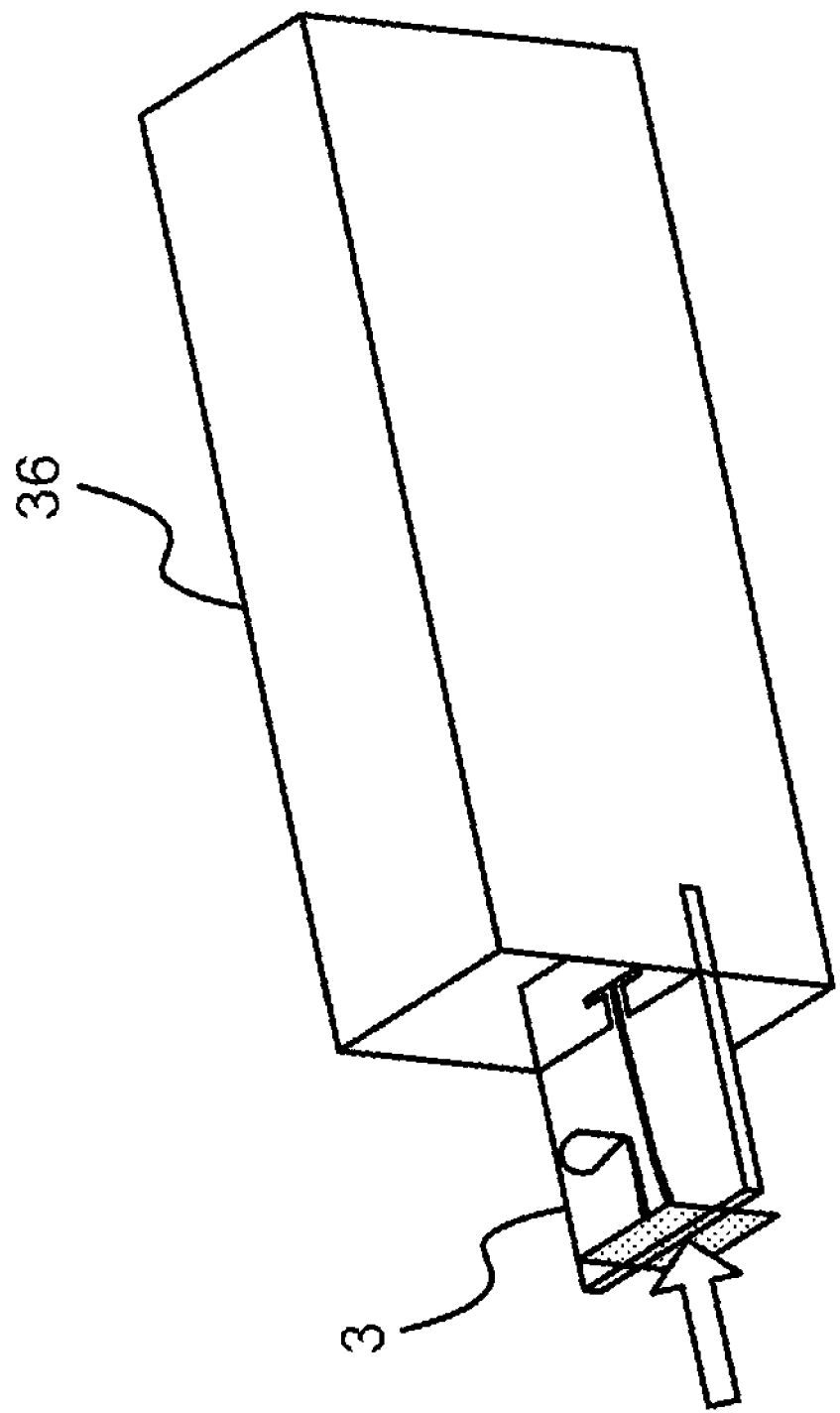
Figure 4:
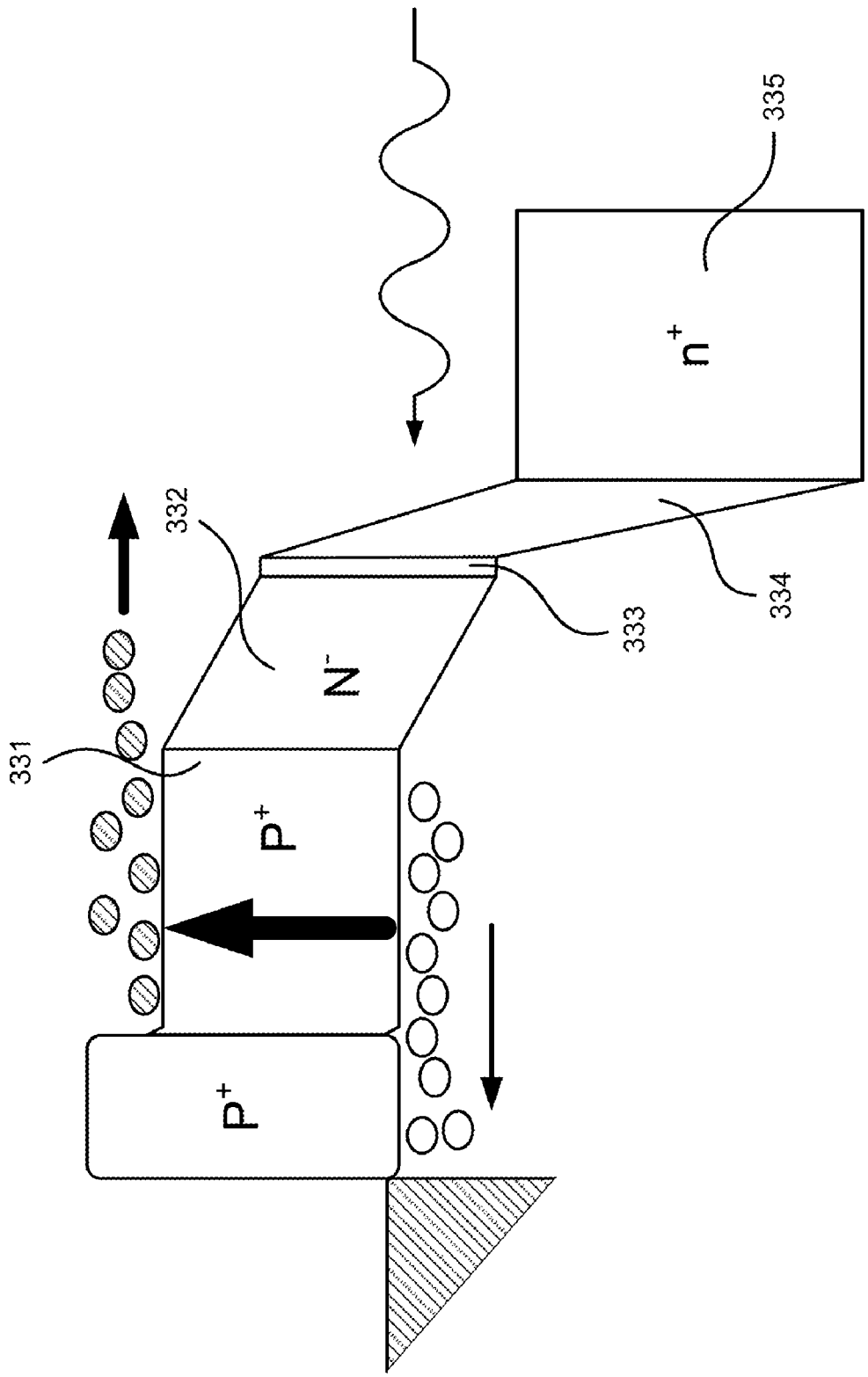
Figure 5:
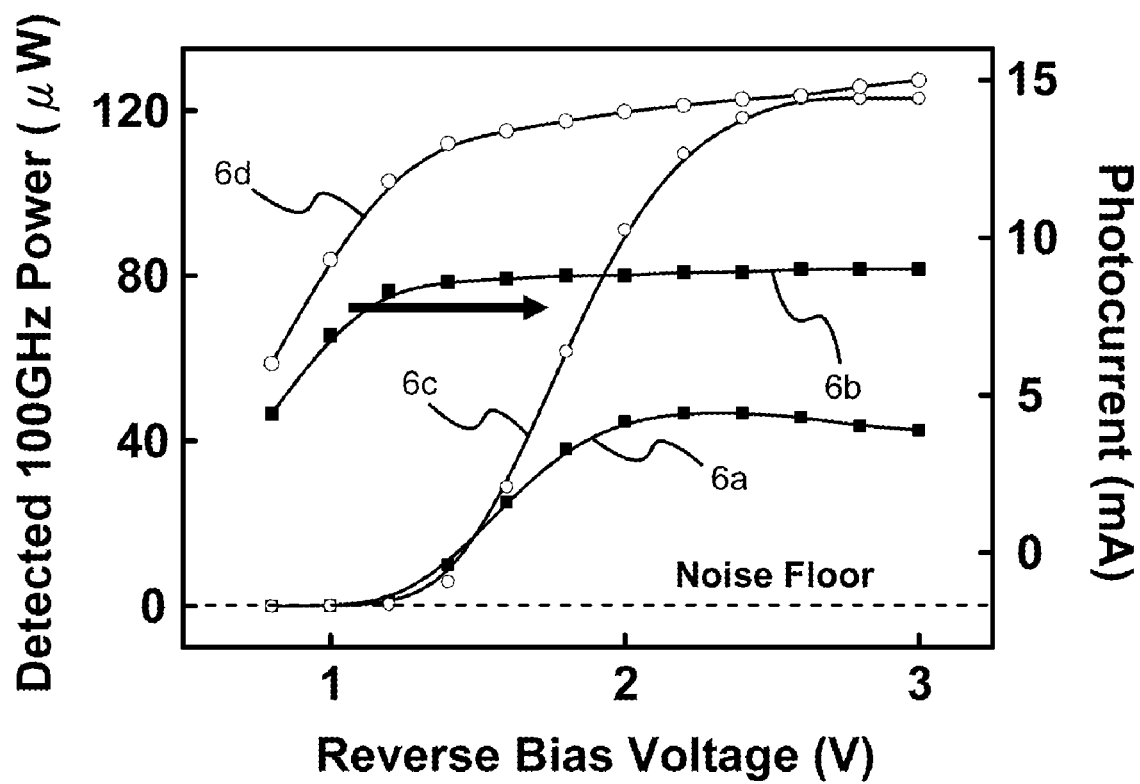
Figure 6:
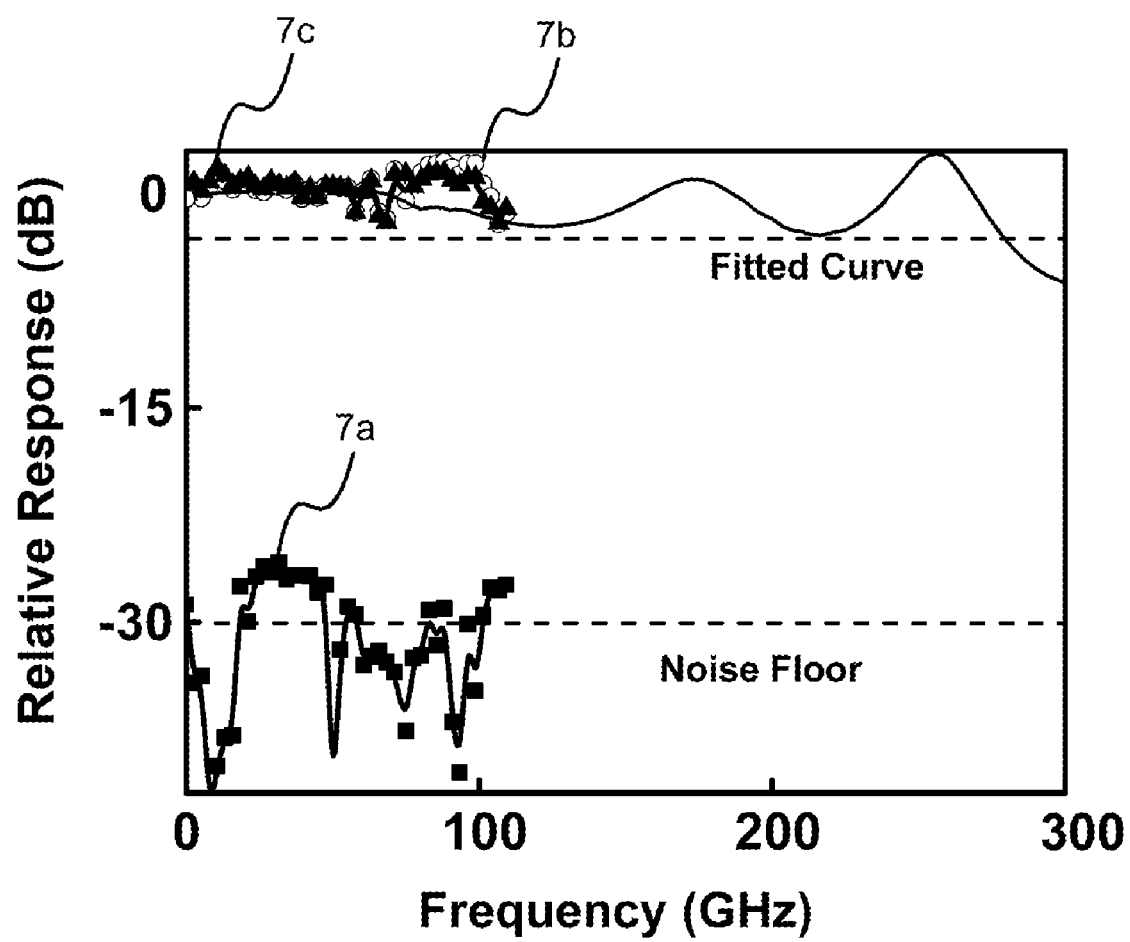
Figure 7:
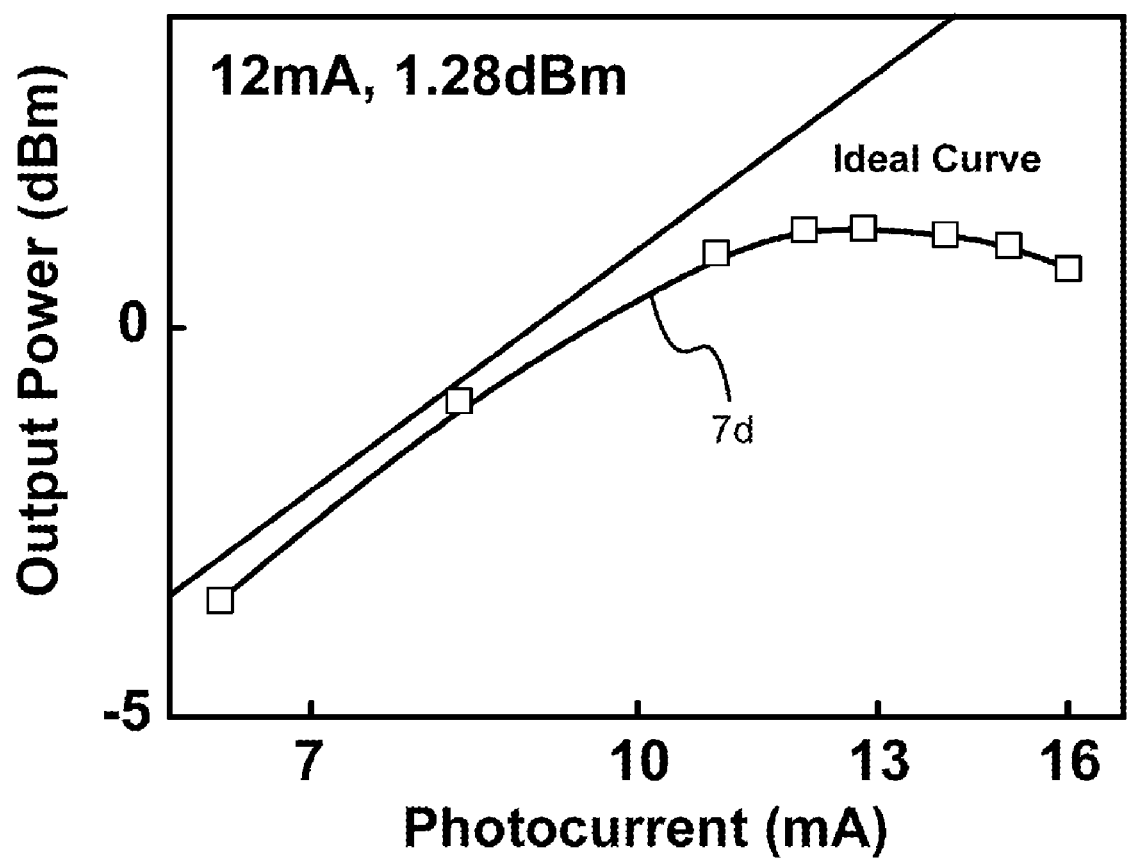

The present disclosure will be better understood from the following detailed description of the preferred embodiment according to the present disclosure, taken in conjunction with the accompanying drawings, in which FIG. 1 is the structural view showing the preferred embodiment according to the present disclosure;
FIG. 2 is the structural view showing the DUT;
FIG. 3 is the perspective view showing the DUT;
FIG. 4 is the view showing the optoelectronic switch;
FIG. 5 is the view sowing the relationship curves between power and photocurrent;
FIG. 6 is the view showing the frequency responses;
FIG. 7 is the view showing the output power curve of the changing photocurrents;
FIG. 8 is the view of the current curve of the prior art; and
FIG. 9 is the structural view of the prior art.

DESCRIPTION OF THE PREFERRED EMBODIMENT

The following description of the preferred embodiment is provided to understand the features and the structures of the present disclosure.

Please refer to FIG. 1 to FIG. 4, which are a structural view showing the preferred embodiment according to the present disclosure; a structural view and a perspective view showing a DUT; and a view showing an optoelectronic switch. As shown in the figures, the present disclosure is an optoelectronic switch transmitter using millimeter wavelength (MMW), comprising an input device 1, a pulse pattern generator (PPG) 2, a device under test (DUT) 3, an antenna-signal processor 4 and an error detector (ED) 5, where a high-power pulse is applied to the DUT 3 to detect emitting of photon from the DUT through sensing light source.

The input device 1 comprises a single-mode fiber (SMF) 11 and a lensed fiber 12, where the lensed fiber 12 is set at a side of the SMF 11 and is connected with a probe at a first end of the SMF 11; and, at another side, the SMF 11 is optically coupled with a light source (optical MMW source) 13, a fiber amplifier 14 (erbium-doped fiber amplifier, EDFA) and an attenuator 15.

The PPG 12 generates 12.5 Gbit/s pulse signals.

A part of the DUT 3 is set in a waveguide 36 and is combined with a first horn antenna 34 through the waveguide 36. The DUT 3 comprises an intermediate frequency (IF) input 31; a radio frequency (RF) choke 32 connected with the IF input 31; an optoelectronic switch 33 connected with the RF choke 32; a fan-shaped broadband transition 34 connected with the optoelectronic switch 33; and a transmitter 35 connected with the optoelectronic switch 33. Therein, there is a tiny wavelength (λ) between the optoelectronic switch 33 and the transmitter 35; the optoelectronic switch 33 has a structure of p-n-p-i-n epi-layers, comprising, from top to bottom, a first p-type doped layer 331, a first n-type doped layer 332, a second p-type doped layer 333, an undoped layer 334 and a second n-type doped layer 335; the epi-layers are grown on a thoroughly-doped or semi-insulating semiconductor substrate; the semiconductor substrate is made of GaAs, InP, GaN, AlN, Si, or GaSb; the first p-type doped layer 331 is a light-absorbing layer made of a light-absorbing material and is graded doped to accelerate emission of electrons; the first n-type doped layer 332 is made of a non-light-absorbing material characterized with ballistic transport to accelerate transport of carriers and is n-type doped to increase a breakdown voltage and a greatest output current; the second p-type doped layer 333 and the undoped layer 334 are made of a non-light-absorbing alloy of a III group element or a IV group element and are doped to a certain degree with a certain thickness to operate the first n-type doped layer 332 at a peak drift velocity of carriers; the second p-type doped layer 333 is thus characterized with ballistic transport; the second n-type doped layer 335 is made of a heavy-doped semiconductor to obtain an ohmic contact; the epi-layers are made of a compound semiconductor and a compound alloy semiconductor; or, is made of a IV group semiconductor and a IV group alloy semiconductor; the compound semiconductor is GaAs, InP or GaN; the compound alloy semiconductor is AlGaN, InGaN, InGaAs, InGaAsP, InAlAs, InP, InAlGaAs, GaAs or AlGaAs; the IV group semiconductor is Si; and, the IV group alloy semiconductor is SiGe.

The antenna-signal processor 4 comprises a W-band low noise amplifier (LNA) 41; a W-band power detector 42 connected with the W-band LNA 41; and an IF amplifier 43 connected with the W-band power detector 42, where the antenna-signal processor 4 is electrically connected with a second horn antenna 40 at a front end.

The ED 5 is electrically connected with the antenna-signal processor 4.

Thus, a novel switch transmitting MMW is obtained.

Therein, the DUT 3 is operated under a reverse bias to intensely change its electron drift-velocity and response according to change of the reverse bias; the transmitter 35 is a Quasi-Yagi antenna; and the optoelectronic switch 33 is a near-ballistic uni-traveling carrier photodiode (NBUTC-PD) used as a side-illumination detector (as shown in FIG. 3) or a vertical-illumination detector (as shown in FIG. 3).

The present disclosure can further comprise a microwave probe to load the PPG 2. As shown in FIG. 1, a signal path comprises an optical path and an electrical path 44. On using the present disclosure, in the optical path 10, the light source 13 of the input device 1 generates a 100 GHz carrier light source. After optical signals are magnified and attenuated through the fiber amplifier 14 and the attenuator 15, light beam of the light source is expanded by the SMF 11 and is outputted as a collimated light beam to be focused through the lensed fiber 12. Thus, the optical signals are efficiently moved from the SMF 11 to the lensed fiber 12 to be filled into the DUT 3 in a form of light spots 330 in the optoelectronic switch 33. In the electrical path 44, the PPG 2 generates 12.5 Gbit/s pulse signals imported into the DUT 3 from the IF input 31 through the microwave probe.

The optical signals from the input device 1 and the pulse signals from the PPG 2 are integrated in the optoelectronic switch 33 of the DUT 3. Through low RF resistance generated by the RF choke 32, a voltage difference between the source of pulse signals and the source of optical signals is weakened. Then, based on broadband signals generated by the fan-shaped broadband transition 34, MMW signals transformed from the optical signals, which have IFs around 100 GHz, are outputted and transmitted to the waveguide 36 by the transmitter 35 to be emitted from the first horn antenna 37.

The antenna-signal processor 4 receives and magnifies waveband of the MMW signals from the second horn antenna 40 to magnify W-band of the MMW signals for obtaining W-band MMW signals. Then, power check is processed to the W-band MMW signals to obtain a check result and the check result is transformed into voltage level signals. Then, base on the voltage level signals, intermediate voltages of the W-band MMW signals are magnified to be outputted to the ED 5 for checking to obtain an error rate of the W-band MMW signals.

Please refer to FIG. 5 to FIG. 7, which are a view sowing relationship curves between power and photocurrent; a view showing frequency responses; and a view showing an output power curve of changing photocurrents. As shown in the figures, when the present disclosure is operated under a reverse bias with a power at 100 GHz and with different optical excited pulses, a 60 milli-watt (mW) power curve 6a with its first photocurrent curve 6b are compared to a 100 mW power curve 6c with its second photocurrent curve 6d. The 100 mW power curve 6c with its second photocurrent curve 6d show that photocurrent is not changed when the reverse bias is increased. Hence, the present disclosure can change power based on change of the reverse bias; and, when the reverse bias is increased, the power of the related MMW signal is increased with a steady photocurrent.

In FIG. 6, with an area of 64 $\mu m^2$ and a photocurrent of 7.5 milli-ampere (mA) and a frequency of 100 GHz, relative response curves 7a, 7b, 7c are measured under bias voltages of 1V, −3V and −5V. In FIG. 7, with the same area and 25 ohms ($\Omega$) of bias resistance under a −3V bias voltage at a 100 GHz frequency, an output power curve 7d for different photocurrents is obtained. It shows that change of reverse bias may cause great change of velocity on components of the present disclosure; and an MMW optoelectronic switch is thus obtained.

In NBUTC structure of the present disclosure, a second p-type doped layer and an undoped layer are added after a first n-type doped layer. Most electrons in an electrical field on the first n-type doped layer are drifted to two ends of the undoped layer and only few electrons in the electrical field are drifted to the first n-type doped layer. When the electrons are drifted, most of the time they are drifted in the first n-type doped layer with ballistic transport; yet only a short time they are drifted in the undoped layer at a low speed. In this way, effect of ballistic transport is obtained with a high bias voltage regardless of load resistance. Besides, because only few electrons in the electrical field are drifted in the first n-type doped layer, more doping is used to increase a greatest output current for enhancing electrical power output without decreasing breakdown voltage.

The present disclosure make most of the electrical field fall on the undoped layer, so that, even through a high bias voltage is used in operation, the first n-type doped layer still has a low electrical field while ballistic transport is kept. Furthermore, doping in the first n-type doped layer is increased to enhance power output without sacrificing breakdown voltage. Moreover, the present disclosure reduces trade-off of bandwidth and a ratio of greatest output power to efficiency on surface area.

To sum up, the present disclosure is an optoelectronic switch transmitter using MMW, where velocity is greatly changed based on change of reverse bias for obtaining an MMW optoelectronic switch.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. An optoelectronic switch transmitter using millimeter wavelength (MMW), comprising
an input device, said input device comprising
a single-mode fiber (SMF) and
a lensed fiber;

a pulse pattern generator (PPG);
a device under test (DUT), said DUT comprising
  an intermediate frequency (IF) input;
  a radio frequency (RF) choke connected with said IF Input;
  an optoelectronic switch connected with said RF choke;
  a fan-shaped broadband transition device connected with said optoelectronic switch; and
  a transmitter connected with said optoelectronic switch;
an antenna-signal processor, said antenna-signal processor comprising
  a W-band low noise amplifier (LNA);
  a W-band power detector connected with said W-band LNA; and
  an IF amplifier connected with said W-band power detector; and
an error detector (ED),
wherein said SMF has a probe at a first end to be optically coupled with
  a light source;
  a fiber amplifier and
  an attenuator;
wherein said lensed fiber is positioned at a side of said SMF and is connected with a second end of said SMF;
wherein said input device receives a collimated beam of optical signals and focuses said collimated beam to move said optical signals from said SMF into said DUT through said lensed fiber;
wherein said PPG generates 12.5 Gbit/s pulse signals entering into said DUT;
wherein said DUT is positioned in a waveguide to be combined to a first horn antenna through said waveguide;
wherein said optoelectronic switch has a structure of p-n-p-i-n epi-layers, comprising, from top to bottom,
  a first p-type doped layer;
  a first n-type doped layer;
  a second p-type doped layer;
  an undoped layer; and
  a second n-type doped layer;
wherein said epi-layers are grown on a semiconductor substrate selected from a group consisting of a thoroughly-doped semiconductor substrate and a semi-insulating semiconductor substrate;
wherein said DUT integrates said pulse signals and said optical signals into MMW signals having IFs and sends said MMW signals having IFs to said first horn antenna to emit said MMW signals having IFs;
wherein said antenna-signal processor is connected with a second horn antenna to receive and magnify W-band of said MMW signals, and then said MMW signals having said W-band magnified (W-band MMW signals) are processed through power check to obtain voltage level signals, and then IF voltages of said W-band MMW signals are magnified based on said voltage level signals;
wherein said ED is electrically connected with said antenna-signal processor to receive said W-band MMW signals and obtain an error rate in said W-band MMW signals;
wherein a voltage pulse is applied to a device under test (DUT) for switching the photo-generated MMW power, the DUT is operated under reverse bias;
wherein an optical light source with modulated MMW envelop is injected on to DUT for MMW power generation.

2. The switch according to claim 1,
wherein said switch further comprises a microwave probe to load said PPG.

3. The switch according to claim 1,
wherein said transmitter is a Quasi-Yagi antenna.

4. The switch according to claim 1,
wherein said PPG inputs said pulse signals into said IF input of said DUT.

5. The switch according to claim 1,
wherein said input device inputs optical signals as light spots in said optoelectronic switch of said DUT.

6. The switch according to claim 1,
wherein said optoelectronic switch is a near-ballistic uni-traveling carrier photodiode (NBUTC-PD) used as a detector selected from a group consisting of a side-illumination detector and a vertical-illumination detector.

7. The switch according to claim 1,
wherein said epi-layers are made of a semiconductor of a material and a semiconductor of an alloy of said material; and
wherein said material is selected from a group consisting of a compound and a IV group element.

8. The switch according to claim 7,
wherein said semiconductor of a compound is selected from a group consisting of GaAs, InP and GaN; and
wherein said semiconductor of an alloy of said compound is selected from a group consisting of AlGaN, InGaN, InGaAs, InGaAsP, InAlAs, InP, InAlGaAs, GaAs and AlGaAs.

9. The switch according to claim 7,
wherein said semiconductor of a IV group element is Si; and
wherein said semiconductor of an alloy of said IV group element is SiGe.

10. The switch according to claim 1,
wherein said first p-type doped layer is a light-absorbing layer made of a light-absorbing material; and
wherein said first p-type doped layer is graded doped to accelerate emission of electrons.

11. The switch according to claim 1,
wherein said first n-type doped layer is made of a non-light-absorbing material characterized with ballistic transport to accelerate transport of carriers; and
wherein said first n-type doped layer is n-type doped to increase a breakdown voltage and a greatest output current.

12. The switch according to claim 1,
wherein said second p-type doped layer and said undoped layer are made of an alloy of an element selected from a group consisting of a III group element and a IV group element; and
wherein said second p-type doped layer and said undoped layer are doped to a certain degree with a certain thickness to operate said first n-type doped layer at a peak drift velocity of carriers.

13. The switch according to claim 1,
wherein said second n-type doped layer is made of a heavy-doped semiconductor to obtain an ohmic contact.

14. The switch according to claim 1,
wherein said semiconductor substrate is made of a material selected from a group consisting of GaAs, InP, GaN, AlN, Si and GaSb.

15. A switch transmitting MMW, comprising
an IF Input, said IF Input receiving and outputting pulse signals;
an RF choke connected with said IF Input,
  wherein said RF choke generates and outputs an RF resistance to weaken a voltage difference between a source of pulse signals and a source of optical signals;

a fan-shaped broadband transition, said fan-shaped broadband transition generating and outputting broadband signals;

an optoelectronic switch connected between said RF choke and said fan-shaped broadband transition, wherein said optoelectronic switch receives said optical signals to be integrated with said pulse signals to obtain MMW signals having IFs based on said broadband signals to output said MMW signals having IFs;

wherein said optoelectronic switch has a structure of p-n-p-i-n epi-layers, comprising, from top to bottom, a first p-type doped layer;
a first n-type doped layer;
a second p-type doped layer;
an undoped layer; and
a second n-type doped layer; and wherein said epi-layers are grown on a semiconductor substrate selected from a group consisting of a thoroughly-doped semiconductor substrate and a semi-insulating semiconductor substrate; and a transmitter connected with said optoelectronic switch to receive and transmit said MMW signals, wherein a high-power pulse is applied to said DUT to detect emitting of photon from said DUT through sensing light source; and wherein said DUT is used under a reverse bias to intensely change velocity and response of said DUT based on change of said reverse bias.

16. The switch according to claim 15,
wherein said optoelectronic switch is a near-ballistic uni-traveling carrier photodiode (NBUTC-PD) used with an illumination selected from a group consisting of a side illumination and a vertical illumination.

17. The switch according to claim 15,
wherein said epi-layers are made of a semiconductor of a material and a semiconductor of an alloy of said material; and
wherein said material is selected from a group consisting of a compound and a IV group element.

18. The switch according to claim 15,
wherein said first p-type doped layer is a light-absorbing layer made of a light-absorbing material; and
wherein said first p-type doped layer is graded doped to accelerate emission of electrons.

19. The switch according to claim 15,
wherein said first n-type doped layer is made of non-light-absorbing material characterized with ballistic transport to accelerate transport of carriers; and
wherein said first n-type doped layer is n-type doped to increase a breakdown voltage and a greatest output current.

20. The switch according to claim 15,
wherein said second p-type doped layer and said undoped layer are made of an alloy of an element selected from a group consisting of a III group element and a IV group element; and
wherein said second p-type doped layer and said undoped layer are doped to a certain degree with a certain thickness to operate said first n-type doped layer at a peak drift velocity of carriers.

\* \* \* \* \*